United States Patent
Home

(10) Patent No.: US 11,728,083 B2
(45) Date of Patent: Aug. 15, 2023

(54) MAGNETIZATION DEVICE

(71) Applicant: LOVINFLAME, INC., Taipei (TW)

(72) Inventor: William Home, Taipei (TW)

(73) Assignee: LOVINFLAME, INC., Taipei (TW)

( * ) Notice: Subject to any disclaimer, the term of this patent is extended or adjusted under 35 U.S.C. 154(b) by 260 days.

(21) Appl. No.: 17/317,916

(22) Filed: May 12, 2021

(65) Prior Publication Data
US 2022/0367100 A1   Nov. 17, 2022

(51) Int. Cl.
| | |
|---|---|
| H01F 13/00 | (2006.01) |
| H01F 7/02 | (2006.01) |
| C12H 1/16 | (2006.01) |
| C02F 1/48 | (2023.01) |
| A23L 5/30 | (2016.01) |

(52) U.S. Cl.
CPC ............ H01F 13/00 (2013.01); A23L 5/30 (2016.08); C02F 1/482 (2013.01); C12H 1/16 (2013.01); H01F 7/0294 (2013.01); A23V 2002/00 (2013.01)

(58) Field of Classification Search
CPC ...... H01F 7/0294; H01F 13/00; H01F 13/006; A23L 5/30; C02F 1/48–1/482; C12H 1/16
See application file for complete search history.

(56) References Cited

FOREIGN PATENT DOCUMENTS

| CN | 2083149 U | * 8/1991 |
|---|---|---|
| CN | 2099756 U | * 3/1992 |

\* cited by examiner

*Primary Examiner* — Ramon M Barrera
(74) *Attorney, Agent, or Firm* — Leong C. Lei

(57) ABSTRACT

A magnetization device includes an outer casing, a base, a rotatable hood, an object-carrying seat, and a drive mechanism. The rotatable hood includes a receiving space. The rotatable hood has a circumferential wall that includes a pair of magnets mounted thereto, with one N pole and one S pole of the magnets being pointing toward the receiving space of the rotatable hood to induce magnetic lines of force and a magnetic field therebetween. The object-carrying seat is disposed in the receiving space of the rotatable hood to support a magnetized object. The drive mechanism drives the rotatable hood to rotate around and outside the magnetized object, such that the magnetized object is kept stationary and the magnets, and thus the magnetic lines of force and the magnetic field, are driven by the rotatable hood to rotate around the magnetized object.

9 Claims, 5 Drawing Sheets

MAGNETIZATION DEVICE

TECHNICAL FIELD OF THE INVENTION

The present invention relates to a magnetization device, which, under a condition that a magnetized object is kept still, allows magnets, as well as a magnetic field and magnetic lines of force generated thereby, to do a rotating motion around the magnetized object, so as to have effect of magnetization acting on the magnetized object in a more uniform and more widely spread manner, to thereby enhance the result of magnetization thereof.

DESCRIPTION OF THE PRIOR ART

Electric charge carrying substances and magnetic substances exist in all sorts of biological material. The earth is a large magnet itself. The electric charge carrying substances and the magnetic substances of all the biologic creatures are constantly acted upon by the magnetic field of the earth to align and move in a regular fashion, so as to create all the various forms of life. All the biologic creatures establish an extremely tight relationship between the characteristics thereof and the electric field, the magnetic field, and the gravitational field of the earth during evolution. Once the intensity of the external magnetic field varies, the characteristics of all the biologic creatures are varied in response thereto.

In a general condition, water is an electric medium and is a polar molecule. With no electric field present, the "center of weights" of the positive charge and the negative charge of a water molecule are not coincident with each other, and a dipole moment that is not null is present. Water molecules are constantly subject to irregular thermal motion, and the direction of the dipole moment of each water molecule is random, so that macroscopically, water shows no electricity. Water is also a magnetic medium and each water molecule has electrons that rotate around the atom to generate a molecular current (which is also referred to as a ring current) to thereby generate a molecular magnetic moment of the molecular current. With no external magnetic field present, the direction of the magnetic moment of each molecule is random, and the magnetic moments of a large number of molecules cancel out each other, so that macroscopically, the molecular current is irregularly distributed, making water exhibiting no magnetism. When water molecules are acted upon by a magnetic field, the molecular magnetic moments are rotated more or less to align in the direction of the magnetic field, so as to exhibit magnetization, making the molecular currents distributed in a regular fashion and thus, macroscopically, generating a magnetizing current, and also to make water molecules and impurity ions (such as $Ca^{2+}$) contained in water gain magnetic energy, and varying the conductivity, osmolarity, surface tension, viscosity, content of dissolved oxygen, pH value, and optic characteristics of water, to thereby cause a series of biological effects.

Magnetization applied to regular water would subject impurities contained in water to the effect of the magnetic field, making them crystalized and gathered together and thus changing and influencing the structure of water, so that the molecular chain of water is shortened; the viscosity of water reduced, surface area expanded, surface tension lowered, activity enhanced, osmotic pressure increased, and dissolubility and oxygen raised.

Thus, treating water with magnetization would increase dissolubility, ionicity, flowability, and oxygen content of water. Such physical properties are very helpful in supplying nutrition for biology and are beneficial for improving metabolism of biology.

In ordinary water, water molecules are naturally linked to each other to form a molecular cluster, of which the physical property is very stable. Magnetization of water, as was known heretofore, is conducted by having water flowing through a magnetic field, so as to have charged particles, such as hydronium ions, contained in the water flowing through the magnetic field, become tiny magnets. The motion of the small magnets in the magnetic field and the interaction therebetween would destruct the molecular clusters, which are generally of a large size to make them molecular clusters of a small size in a metastable state. Such a metastable structure of relatively small molecular clusters exhibits enhanced physiochemistrical activity and biological activity, such as enhanced skin wettability and improved minerals dissolubility. Thus, bathing with such kind of water would be good for absorption by skin, prevention and therapy of skin diseases, and improvement of skin elasticity.

Magnetized water molecules are small and may easily penetrate into cells to help exchange of substance inside and outside cells. Showering with magnetized water supplied from a water heater helps keep human body healthy, improves functionality of skin, prevent skin diseases, and makes skin highly elastic, and thus making people look radiant and good for beautification, and prevention and therapy of all sorts of skin disease, and is thus the cheapest and most harmless solution for beautification and health caring. As early as 500 years ago, Chinese medical institutes have discovered that magnetized water demonstrates effectiveness in curing sores and improving growth of muscles and skins. There was a record that covering a blooding wound with a magnet would release pain and stop blooding, and apparently, there is also an effect of curing hemorrhoid.

By making use of the property that magnetized water has increased dissolubility for $CaCO_3$, brushing teeth with magnetized water in every morning and every night and washing mouth with magnetized water supplied from a water heater to throughout clean teeth would help reduce the occurrence of oral diseases and remove odor smells from the mouth. For extended use for a long period of time, it also helps remove ineradicable tooth stains and dental calculus, making teeth beautiful and white.

In view of the above, experiments conducted by scientists revealed that all kinds of material, once acted upon by magnetism, would cause rearrangement of atomic charges inside the material, leading to certain variation of the physical properties thereof. For example, water, once subject to magnetism, would have the charges thereof re-arranged to provide advantages to, such as reduced water surface tension, improved penetrability, and stabilized pH value, and is of great help for improving human health. Automobile fuel, once subject to magnetism, would make cause fining of fuel molecules to thereby improve flowability of the fuel, making fuel combustion more complete to exhibit higher efficiency. Cosmetics, once subject to magnetism, would become cosmetics of reduced molecule sizes to thereby greatly improve absorbability thereof by skins.

Prior art techniques of magnetization is known, such as U.S. Pat. No. 6,022,479, which is related to "Method and Device for Producing Activated Liquids and Methods of Use Thereof." The technical solution of the patent is briefly discussed in the following.

The known device for producing activated liquids is generally a static magnetism structure including a liquid reservoir; a body formed of a polymeric matrix containing a number of materials, the body being disposed in a strong magnetic field and is responsive to electromagnetic radiation and having one end disposed proximate to the surface of the liquid; and an electrical circuit adjacent the other end of the body to activate diodes to emit flashes of light having a predetermined wavelength and a predetermined frequency, so that the polymeric body is energized and emits low frequency oscillations, which activate the liquid contained in the reservoir.

Such a known device has drawbacks that are discussed below:

(1) The structure is complicated, and the fabrication cost is increased (2) The magnetic field used is a static magnetic field, and also, the low frequency oscillations emitting from the energized polymeric body shows only downward and partial conductivity to the liquid contained in the reservoir, and thus the effect of magnetization does not act on the liquid in a uniform and widely spread manner, making the result of magnetization imperfect.

Thus, it is necessary to develop a magnetization device that allows magnetization effect to act on a magnetized object in a more uniform and more widely spread manner to thereby enhance the result of magnetization.

SUMMARY OF THE INVENTION

An objective of the present invention is to provide a magnetization device, which allows magnets, as well as a magnetic field and magnetic lines of force generated thereby, to do a rotating motion around a magnetized object that is kept stationary, so as to have effect of magnetization acting on the magnetized object in a more uniform and more widely spread manner, to thereby enhance the result of magnetization thereof.

To achieve the above objective, the present invention comprises an outer casing, a base, a rotatable hood, an object-carrying seat, and a drive mechanism, wherein the base comprises a fixing pole; the rotatable hood comprises a receiving space formed in an interior thereof, the rotatable hood having a lower end that is movably disposed on the fixing pole, the rotatable hood having a circumferential wall that comprises at least one pair of magnets disposed thereon, in a manner that at least one N pole and at least one S pole of the pair of magnets are pointing toward the receiving space of the rotatable hood, such that magnetic lines of force are induced between the N pole and the S pole to define a magnetic field in the interior of the rotatable hood; the object-carrying seat is fixed to the fixing pole and located in the receiving space formed in the interior of the rotatable hood to support a magnetized object thereon; and the drive mechanism arranged in the base to drive the rotatable hood to rotate around and outside the magnetized object.

A magnetized object (such as water, tea, alcohol, and coffee) is set in a stationary condition, and the magnets are driven by the rotatable hood to rotate around and outside the magnetized object, such that the magnetic lines of force and the magnetic fields induced thereby are also set in rotation to thereby make the effect of magnetization acting on the magnetized object in a more efficient, more uniform, and more widely spread manner to thereby enhance the result of magnetization and thus more effective in varying the molecular structure and arrangement of the magnetized object 90 to vary the biologic and physical properties thereof.

A description of an embodiment will be provided below with reference to the attached drawings, in order to ensure better understanding and appreciation of the functionality and features of the present invention.

DETAILED DESCRIPTION OF THE PREFERRED EMBODIMENT

Figure 1:
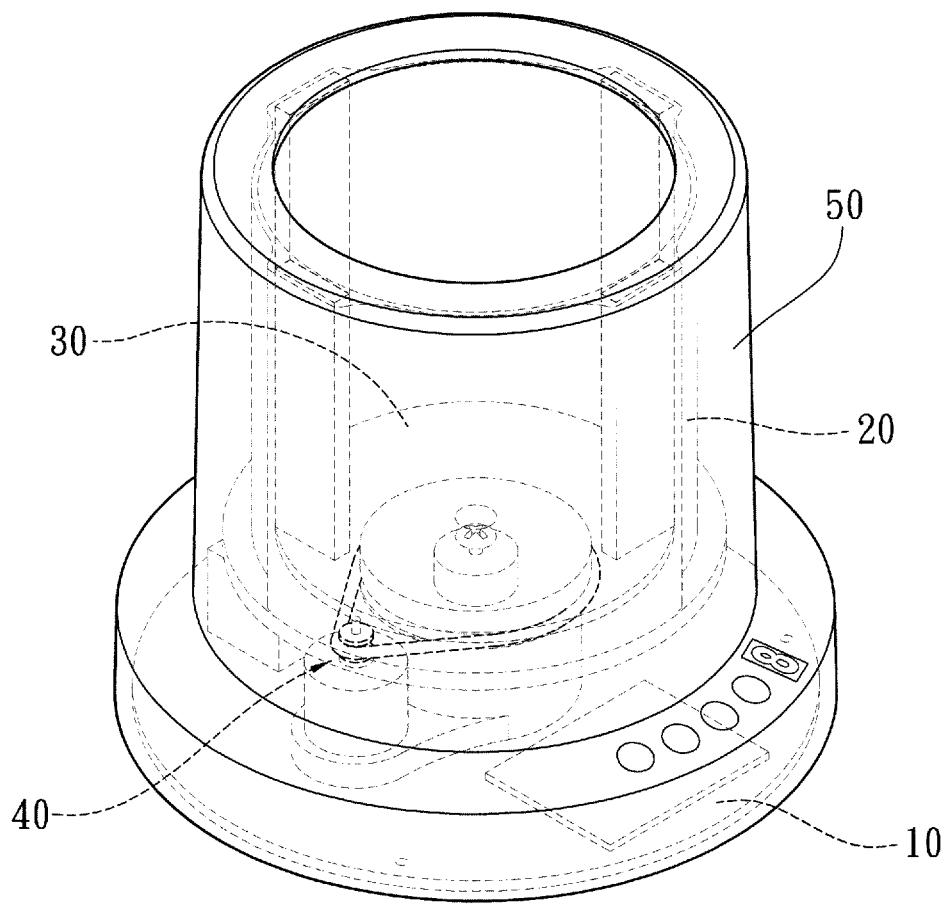
FIG. 1 is a perspective view of the present invention.
Figure 2:
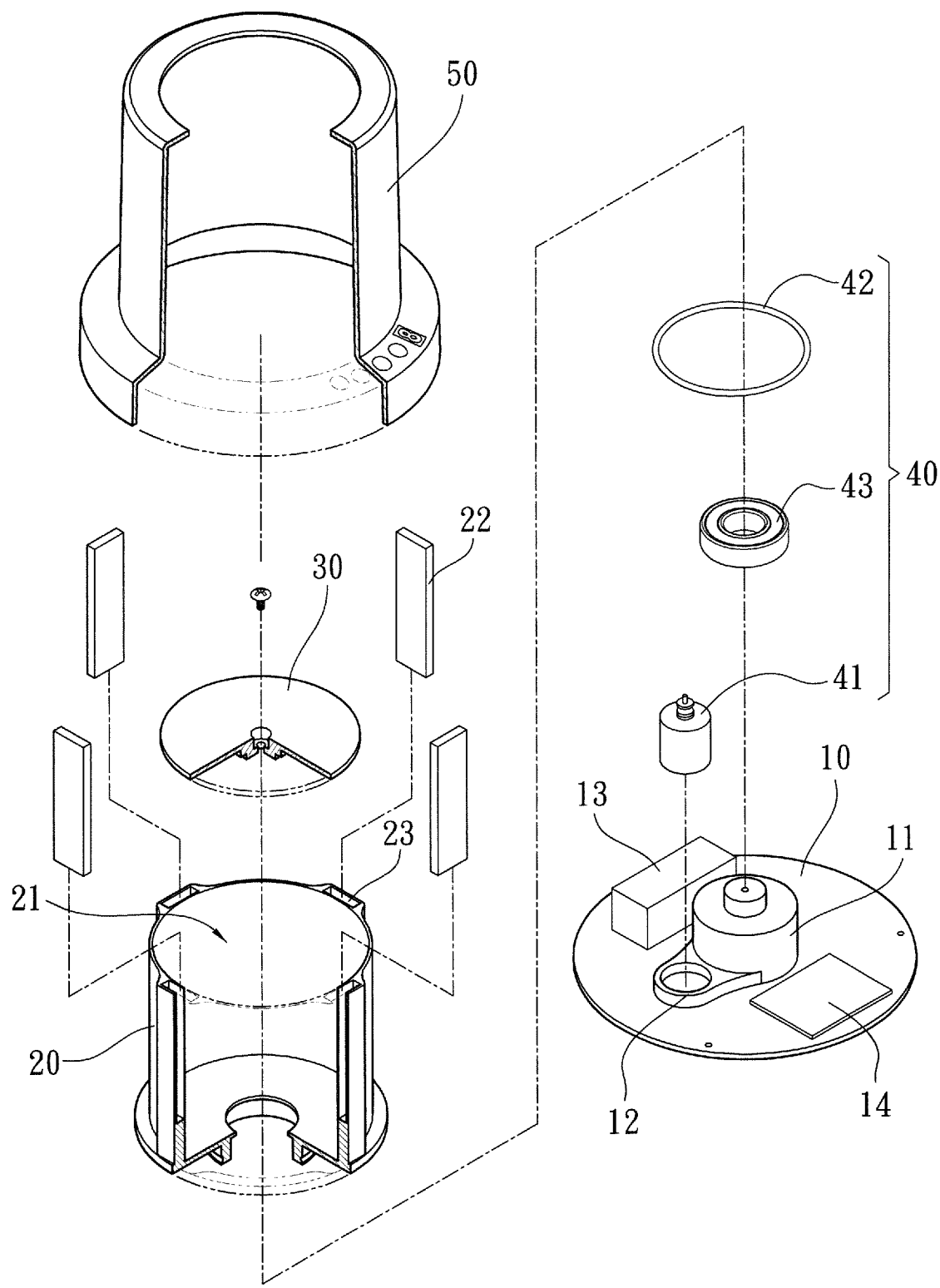
FIG. 2 is an exploded view of the present invention.
Figure 3:
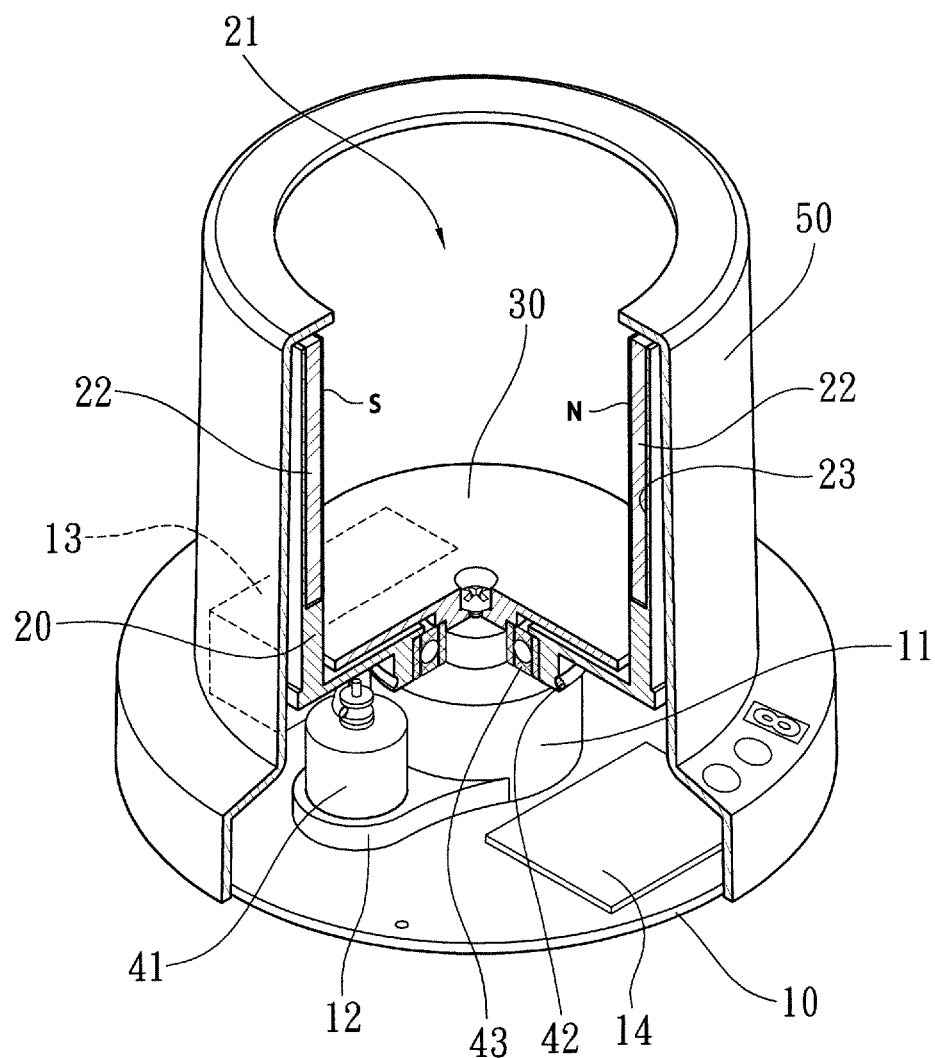
FIG. 3 is a perspective view, partly broken and sectioned, showing the present invention.

Referring to FIGS. 1, 2, and 3, the present invention comprises a base 10, a rotatable hood 20, an object-carrying seat 30, a drive mechanism 40, and an outer casing 50. Details are provided below.

The base 10 comprises a fixing pole 11.

The rotatable hood 20 comprises a receiving space 21 formed in an interior thereof. The rotatable hood 20 has a lower end that is movably arranged on the fixing pole 11. The rotatable hood 20 has a circumferential wall that comprises four magnets 22 (namely two pairs of magnets) provided thereon, with at least one N pole and at least one S pole of the magnets 22 pointing toward the receiving space 21 of the rotatable hood, such that magnetic lines of force are induced between the N pole and the S pole (such as curved arrows shown in FIG. 6) to define a magnetic field in the interior of the rotatable hood 20.

Figure 4:
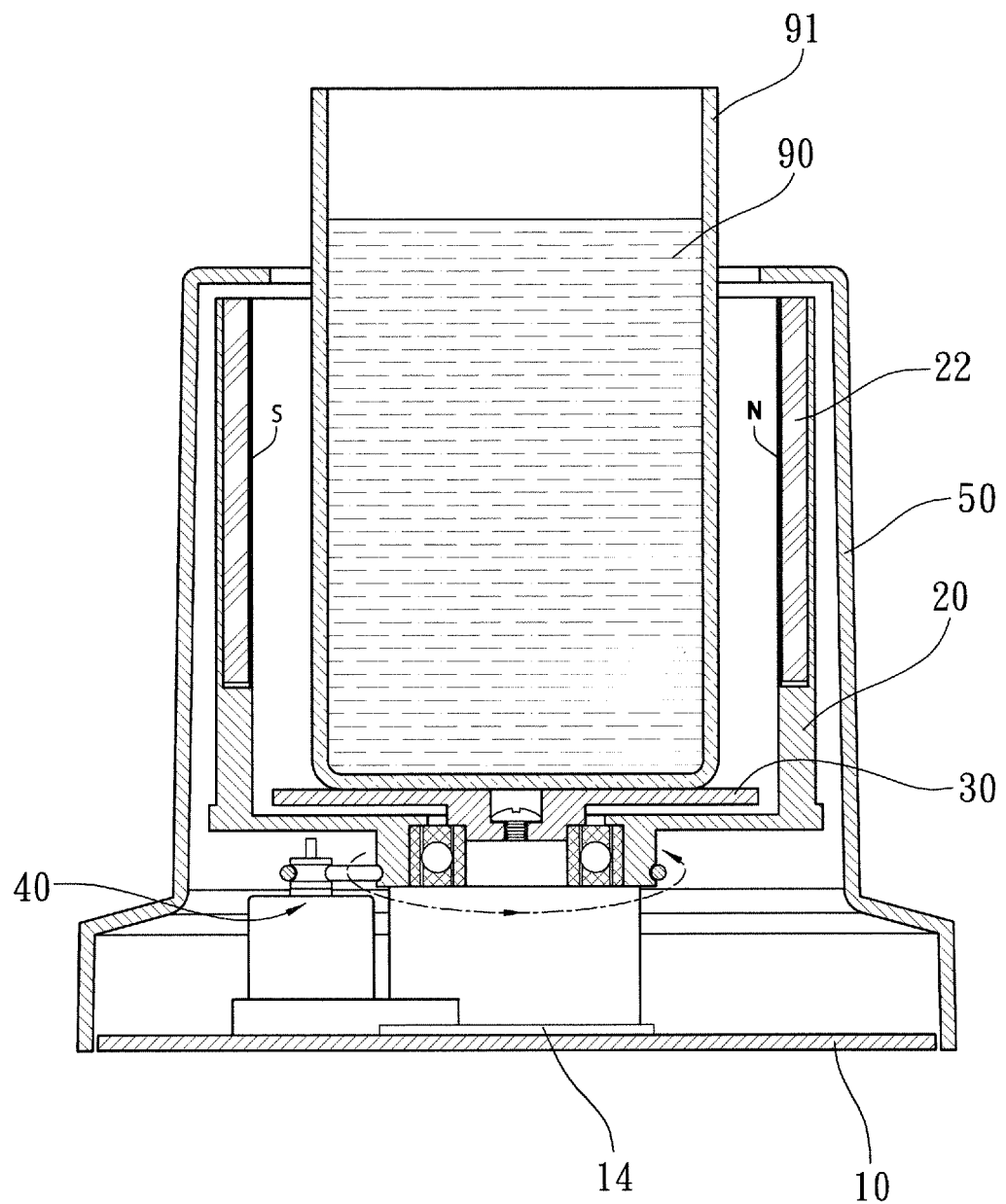
FIG. 4 is a cross-sectional view showing the present invention in a state of use.

The object-carrying seat 30 is fixed on the fixing pole 11 and is located in the receiving space 21 formed in the interior of the rotatable hood 20 to receive and support a magnetized object (or an object to be magnetized) 90 thereon (as shown in FIG. 4).

The drive mechanism 40 is arranged in the base 10 to drive the rotatable hood 20 to rotate around outside of the magnetized object 90 (as shown in FIG. 4).

In an embodiment, the magnetized object is selected as one of water, tea, alcohol, and coffee.

In an embodiment, the base 10 is combined with an outer casing 50. The outer casing 50 is of a hollowed structure that surrounds and encloses the rotatable hood 20 such that the rotatable hood 20 is not exposed to the outside and thus, allowing the rotatable hood 20 to rotate inside the outer casing 50 in a safe manner. Referring to FIG. 4, the outer casing 50 has a top opening having a diameter that is smaller than a diameter of a top opening of the rotatable hood 20 and thus provides an effect of position constraining that prevents the container 91 from contacting and hitting the rotatable hood 20, leading to breaking thereof.

In an embodiment, the rotatable hood 20 is formed, in the circumferential wall thereof, with a plurality of disposition troughs 23 corresponding, in position, to the magnets 22, in order to receive the magnets 22 therein in a manner of being embedded.

In an embodiment, each of the magnets 22 is of an elongated shape that is arranged in a vertical direction on the circumferential wall of the rotatable hood 20 in order to provide magnetic lines of force and magnetic fields to cover an enlarged range or area.

In an embodiment, the drive mechanism 40 comprises a motor 41, a transmission rubber ring 42, and a bearing 43. The motor 41 is arranged in the base 10. The bearing 43 (such as a ball bearing) has an inner wall fit to and fixed to the fixing pole 11. The lower end of the rotatable hood 20 is fit to and fixed to an outer wall of the bearing 43, such that the lower end of the rotatable hood 20 is movably mounted on the fixing pole 11. Two opposite sides of the transmission rubber ring 42 are respectively fit to and wrapped around a spindle of the motor 41 and the lower end of the rotatable hood 20 in a manner of being in driving coupling therewith, so that the rotation of the motor 41 is transmitted through the transmission rubber ring 42 to drive the rotatable hood 20 to do rotating motion around and outside the magnetized object (as shown in FIG. 4).

In an embodiment, the base 10 comprises a holed seat 12 that supports the motor 41 thereon.

In an embodiment, the base 10 further comprises a power supply unit 13 and a control circuit board 14 arranged therein. The power supply unit 13 and the control circuit board 14 are in electrical connection with the motor 41 to form a control loop, through which the power supply unit 13 supplies electrical power to the motor 41 and the control circuit board 14 controls the rotating speed of the motor 41 to thereby control the rotational speed of the rotatable hood 20. The power supply unit 13 can be a battery.

The above provides a description to the components of the present invention and the assembly thereof. In the following, examples of use, features, and advantages of the present invention will be discussed.

Referring to FIG. 4, the magnetized object 90 can be any liquid, such as water, tea, alcohol, and coffee, which is introduced into and held in a container 91 first, and then disposed on the object-carrying seat 30 and located inside the rotatable hood 20.

The drive mechanism 40 is operable to drive the rotatable hood 20 to rotate, so that under the condition that the magnetized object 90 is kept stationary, the magnets 22 are driven by the rotatable hood 20 to rotate around and outside the magnetized object 90, and also, the magnetic lines of force and the magnetic field generated thereby are also set in rotating, making the effect of magnetization to act on the magnetized object 90 in a more efficient, more uniform, and more widely spread manner to thereby enhance the result of magnetization and thus more effective in varying the molecular structure and arrangement of the magnetized object 90 to vary the biologic and physical properties thereof.

Figure 7:
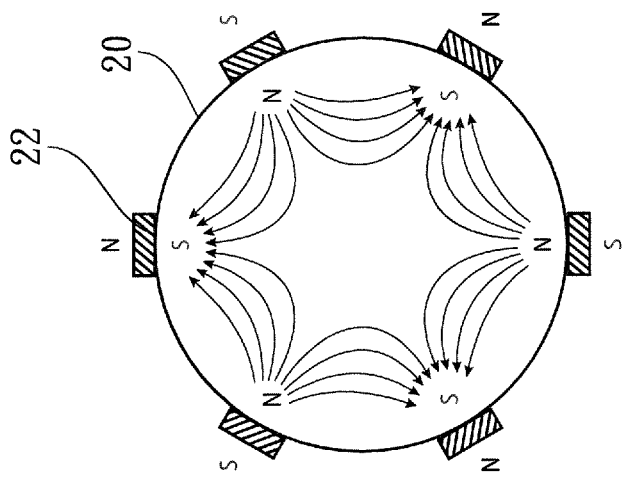
FIG. 7 is a schematic view showing a further example of arrangement of magnets according to the present invention.
Figure 6:
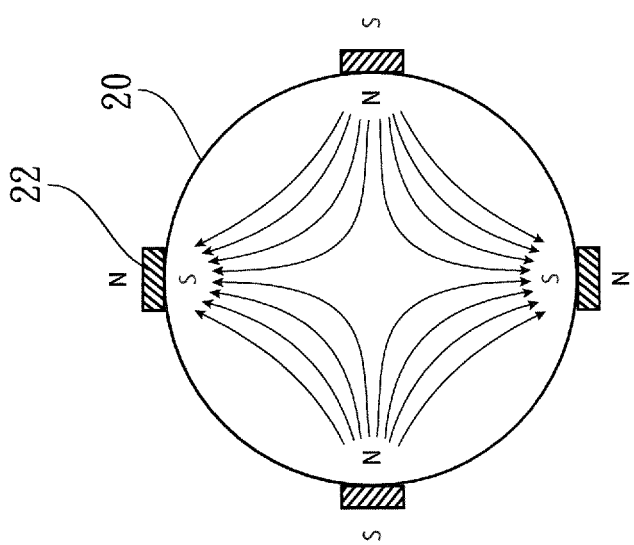
FIG. 6 is a schematic view showing another example of arrangement of magnets according to the present invention.
Figure 5:
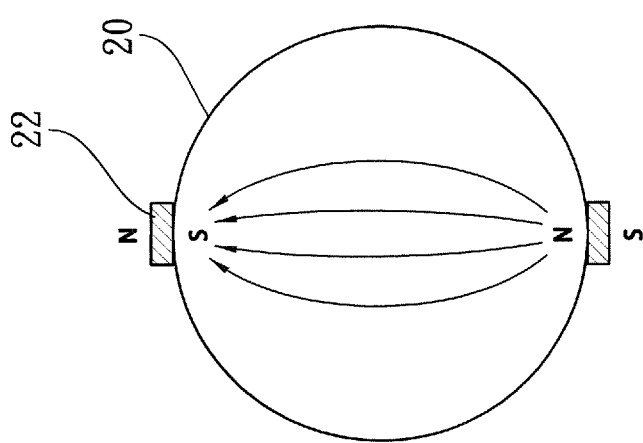
FIG. 5 is a schematic view showing an example of arrangement of magnets according to the present invention.

Referring to FIGS. 5, 6, and 7, schematic views are provided to illustrate examples of arrangement of multiple magnets. The circumferential wall of the rotatable hood 20 may be provided with two magnets 22 (namely one single pair of magnets 22), four magnets 22 (namely two pairs of magnets 22), or six magnets 22 (namely three pairs of magnets 22). However, the number of magnets 22 is not limited by such examples. Further, as shown in the drawings, an increased number of (or more) such magnets 22 could generate an increased number (or more) magnetic lines of force and an increased intensity (or stronger) magnetic field inside the rotatable hood 20.

In summary, the magnets 22 are arranged in multiplicity in a corresponding (or symmetric) and uniform manner, such that the N poles and the S poles of all the magnets 22 can be correctly opposite to each other to induce magnetic lines of force therebetween, without causing a situation that some of the magnets 22 do not involve in the generation of magnetic field. As such, the effect of magnetization is made acting on the magnetized object in a more uniform and more widely spread manner to thereby enhance the result of magnetization.

I claim:

1. A magnetization device, comprising:
   a base, which comprises a fixing pole;
   a rotatable hood, which comprises a receiving space formed in an interior thereof, the rotatable hood having a lower end that is movably disposed on the fixing pole, the rotatable hood having a circumferential wall that comprises at least one pair of magnets disposed thereon, in a manner that at least one N pole and at least one S pole of the pair of magnets are pointing toward the receiving space of the rotatable hood, such that magnetic lines of force are induced between the N pole and the S pole to define a magnetic field in the interior of the rotatable hood;
   an object-carrying seat, which is fixed to the fixing pole and located in the receiving space formed in the interior of the rotatable hood to support a magnetized object thereon; and
   a drive mechanism, which is arranged in the base to drive the rotatable hood to rotate around and outside the magnetized object.

2. The magnetization device according to claim 1, wherein the magnetized object is selected as one of water, tea, alcohol, and coffee.

3. The magnetization device according to claim 1, wherein the base is connected with an outer casing, the outer casing being of a hollowed structure that surrounds and encloses the rotatable hood to prevent the rotatable hood from being exposed to the outside and to allow the rotatable hood to rotate inside the outer casing in a safe manner; and the outer casing has a top having opening having a diameter that is smaller than a diameter of a top opening of the rotatable hood for position constraining to prevent a container from hitting the rotatable hood to get contact therewith.

4. The magnetization device according to claim 1, wherein the circumferential wall of the rotatable hood is formed with a plurality of disposition troughs corresponding, in position, to the magnets in order to receive the magnets in an embedded manner.

5. The magnetization device according to claim 1, wherein each of the magnets is of an elongated shape that is arranged in a vertical direction on the circumferential wall of the rotatable hood to generate magnetic lines of force and magnetic fields covering a wide range.

6. The magnetization device according to claim 1, wherein the drive mechanism comprises a motor, a transmission rubber ring, and a bearing, wherein the motor is disposed in the base; the bearing has an inner wall fit to and fixed to the fixing pole; the lower end of the rotatable hood is fit to and fixed to an outer wall of the bearing, such that the lower end of the rotatable hood is movably mounted to the fixing pole; and two sides of the transmission rubber ring are respectively fit over and wrapped around a spindle of the motor and the lower end of the rotatable hood in a manner of being in driving coupling therewith, so that the rotation of the motor is transmitted through the transmission rubber ring to drive the rotatable hood to rotate around and outside the magnetized object.

7. The magnetization device according to claim 6, wherein the base comprises a holed seat that supports the motor.

8. The magnetization device according to claim 6, wherein the base further comprises a power supply unit and a control circuit board, the power supply unit and the control circuit board being in electrical connection with the motor to form a control loop through which the power supply unit supplies electrical power to the motor and the control circuit board controls a rotating speed of the motor to thereby control a rotational speed of the rotatable hood.

9. The magnetization device according to claim 1, wherein the magnets are arranged in multiplicity in a corresponding and uniform manner, such that N poles and S poles of the magnets are opposite to each other to generate the magnetic lines of force therebetween.

* * * * *